April 14, 1964 F. DE LUCA 3,128,948
INJECTION NOZZLE FOR INTERNAL COMBUSTION ENGINES
Filed Nov. 16, 1962 2 Sheets-Sheet 1
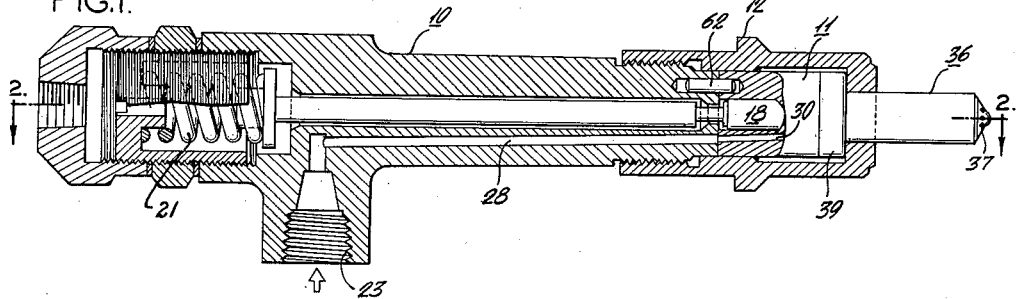
FIG.1.
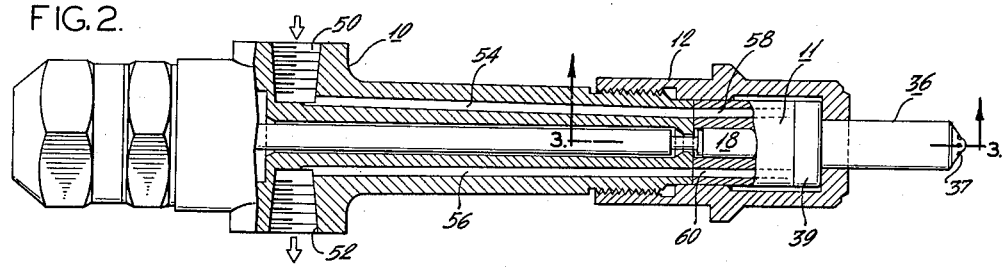
FIG.2.
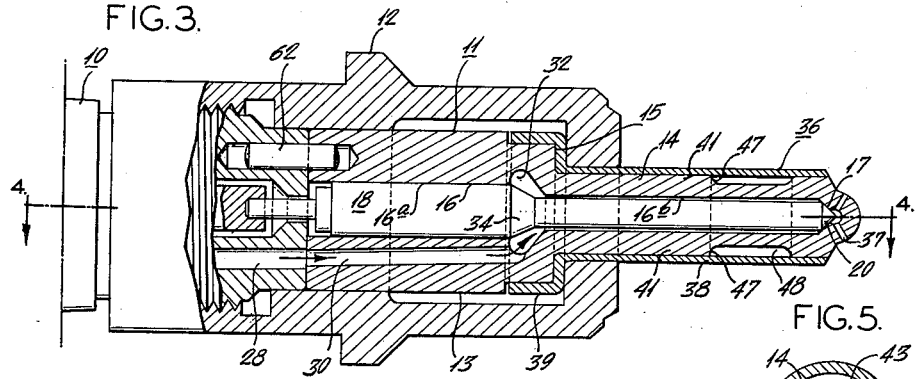
FIG.3.
FIG.5.
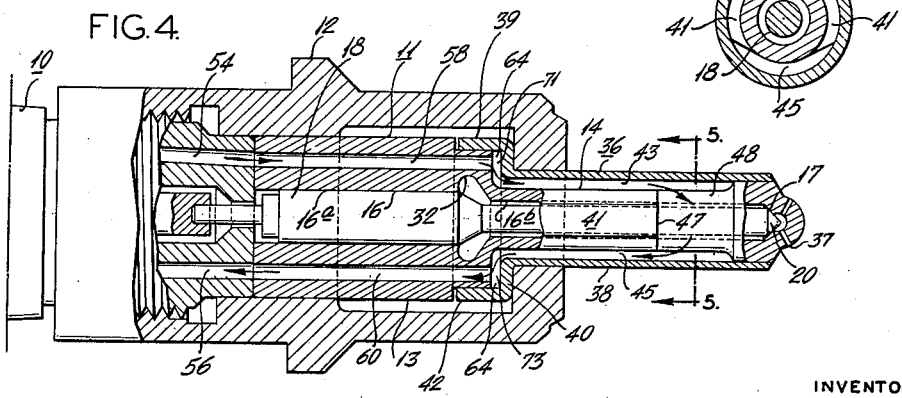
FIG.4.
INVENTOR:
FRANK DE LUCA
BY Howson & Howson
ATTYS.

April 14, 1964  F. DE LUCA  3,128,948
INJECTION NOZZLE FOR INTERNAL COMBUSTION ENGINES
Filed Nov. 16, 1962  2 Sheets-Sheet 2
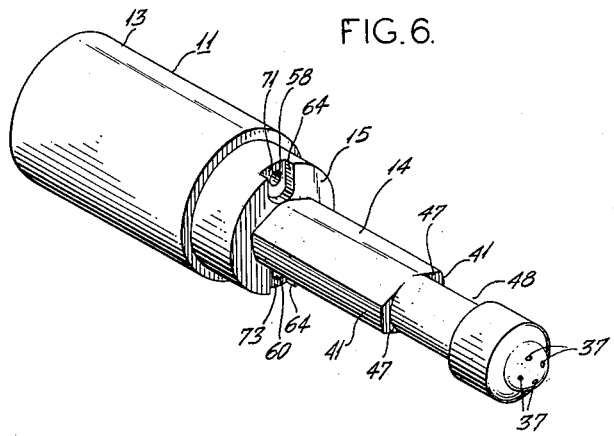
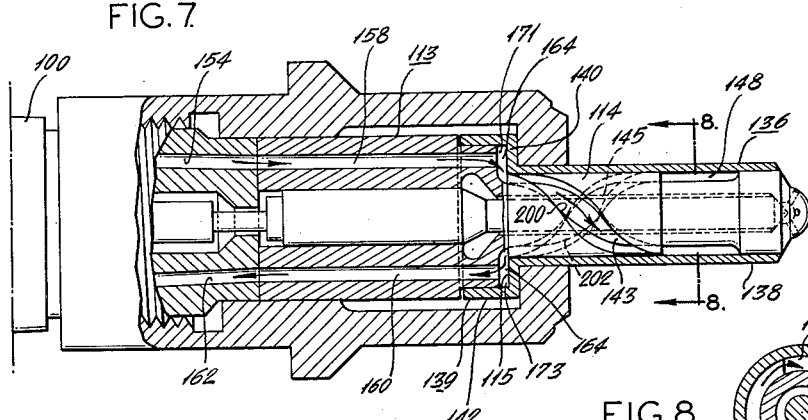
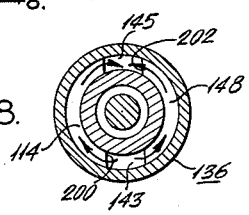
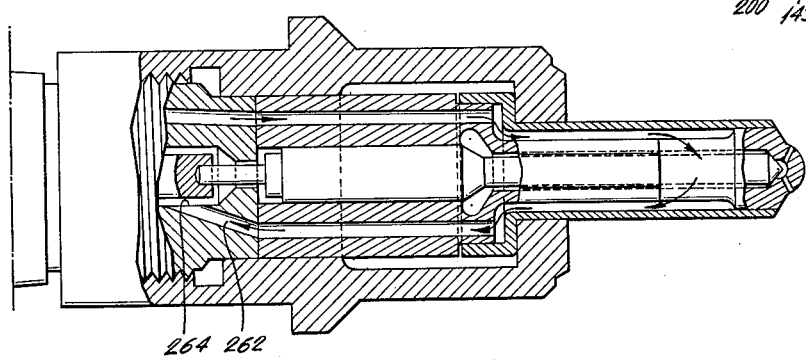
INVENTOR:
FRANK DE LUCA
BY
Howson & Howson
ATTYS.

United States Patent Office 3,128,948
Patented Apr. 14, 1964

3,128,948
INJECTION NOZZLE FOR INTERNAL
COMBUSTION ENGINES
Frank De Luca, Thompsonville, Conn., assignor to American Bosch Arma Corporation, Springfield, Mass., a corporation of New York
Filed Nov. 16, 1962, Ser. No. 238,145
5 Claims. (Cl. 239—132)

The present invention relates to cooled injection nozzles for internal combustion engines.

An object of the present invention is to provide a cooled injection nozzle having novel features of construction and arrangement providing for rapid, continuous circulation of large quantities of coolant thereby to cool the nozzle effectively.

Another object of the present invention is to provide a cooled injection nozzle for internal combustion engines charaterized by structural symmetry whereby the nozzle may withstand high temperature conditions, for example, during heat treatment and in operation in an engine without danger of distortion.

A further object of the present invention is to provide a compact, relatively small cooled injection nozzle especially adapted for use in internal combustion engines where a comparatively small amount of space is available for the nozzle.

A still further object of the present invention is to provide a cooled injection nozzle for use in internal combustion engines which is of small, relatively compact size and has novel features of construction and arrangement for circulation of large quantities of coolant therethrough.

Still another object of the present invention is to provide a cooled injection nozzle of comparatively simplified construction which may be manufactured economically and is fully effective for the purposes intended.

These and other objects of the present invention and the various structural details thereof are hereinafter more fully set forth with reference to the accompanying drawings, in which:

FIG. 1 is a side elevational view partly in section of nozzle holder and nozzle constructed in accordance with the present invention;

FIG. 2 is a sectional view taken on the line 2—2 of FIG. 1;

FIGS. 3 and 4 are enlarged sectional views taken on lines 3—3 and 4—4 of FIGS. 2 and 3 respectively;

FIG. 5 is an enlarged sectional view through the nozzle tip taken on line 5—5 of FIG. 4;

FIG. 6 is a perspective view of a nozzle holder and nozzle assembly with the jacket removed to show the construction of the nozzle;

FIG. 7 is a side elevational view partly in section showing another embodiment of nozzle in accordance with the present invention;

FIG. 8 is an enlarged sectional view taken on line 8—8 of FIG. 7; and

FIG. 9 is a side elevational view partly in section of a nozzle in accordance with the present invention and a modified form of nozzle holder.

Referring now to the drawings and particularly to FIGS. 1 and 2 thereof, there is illustrated an assembly of a nozzle holder 10 and a fuel injection nozzle 11 in accordance with the present invention which is mounted at the lower axial end of the holder 10 by means of a capnut 12. The structural details and arrangement of the nozzle 11 are best shown in FIGS. 3 and 4 and as illustrated therein, the nozzle 11 comprises a generally cylindrical body 13, an elongated nozzle tip 14 which projects from the lower axial end of the body 13 and is of a reduced cross section to define a radial shoulder 15 at the juncture of the nozzle tip and body.

The nozzle is provided with a stepped axial bore 16 consisting of an upper bore section 16a and a lower bore section 16b which terminates in a conical seat 17 adjacent the free outer end of the nozzle tip 14. A valve 18 is mounted in the bore 16 and has a conical tip 20 at one end which normally is urged against the seat 17 by means of a spring 21 housed in the holder 10. A fuel inlet port 23 is provided at the upper end of the holder 10 through which fuel from a suitable supply source enters the holder and flows through aligned axial passageways 28 and 30 in the holder and nozzle respectively to an annular chamber 32 at the step portion of the axial bore 16 in the nozzle. When the fuel pressure acting on a tapered shoulder 34 of the valve 18 is sufficient to overcome the force of the spring 21, the valve 18 is raised whereby the fuel passes from the chamber 32 and the annular space between the valve 18 and bore 16 through orifices 37 in the outer end of the tip and into the engine cylinder or combustion chamber.

In accordance with the present invention, means is provided for circulating a coolant through the nozzle, the nozzle being characterized by novel features of construction and arrangement providing for efficient circulation of a coolant therethrough to produce effective cooling of the nozzle and by structural symmetry whereby the nozzle may withstand elevated temperature conditions without danger of distortion. To this end a jacket 36 is provided which comprises a generally cylindrical hollow sleeve portion 38 which surrounds and is coextensive with the nozzle tip 14 and which is secured at its lower axial end adjacent the outer free end of the tip 14 and a cup 39 at the upper axial end of the sleeve portion 38 in which the lower end of the nozzle body 13 is nested. The cup 39 consists of a radial flange 40 which abuts the shoulder 15 and cylindrical skirt 42 which projects upwardly from the outer peripheral edge of the flange 40 and which is secured to the nozzle body 13 adjacent the lower end thereof. Diametrically opposed wall portions of the nozzle tip 14 extending downwardly from the shoulder 15 are cut away to provide a pair of radially projecting lobes or projections 41 which bear tightly against the sleeve 38 of jacket 36. The cut away wall portions define with the inner wall of the sleeve 38 axially extending diametrically opposed inlet and outlet coolant passageways 43 and 45 of crescent shaped cross section separated by the lobes 41. The lobes 41 extend from the shoulder 15 downwardly and terminate at 47 to define a circumferentially extending annulus or cooling chamber 48 adjacent the free end of the nozzle tip 14 which is in fluid communication with the passageways 43 and 45. Radial slots 64 are provided in the shoulder 15 to form with the radial flange 40 of the jacket, short channels 71 and 73 connecting the inlet and outlet passageways 43 and 45 in the nozzle tip with the axially extending conduits 58 and 60 in the valve body 13. It is noted that by providing slots in the outer wall of the shoulder 15 to form the channels 71 and 73 and undercutting the wall of the nozzle tip to form the passageways 43 and 45, the cross section of the channels and passageways may be made large enough to insure a good coolant flow characteristic without unnecessarily weakening wall sections of the nozzle. This also facilitates provision of a cooled nozzle of comparatively small size. Additionally it is noted that this arrangement provides a symmetrical nozzle construction minimizing danger of distortion of the nozzle during heat treatment or heating of the nozzle in operation.

In the assembly shown in FIG. 2 coolant is delivered to the cooling chamber 48 through the holder 10 and to this end coolant inlet and outlet ports 50 and 52 are provided in the holder 10 which are adapted to be connected to a suitable coolant supply source and reservoir respectively to facilitate circulation of coolant through the holder and nozzle. The ports 50 and 52 communicate respectively with axially extending supply and discharge passages 54 and 56 in the nozzle holder 10 which register with inlet and outlet conduits 58 and 60 in the nozzle body 13. A dowel pin 62 is provided to align the holder and nozzle for flow of fuel and coolant therebetween and the confronting engaging surfaces of the holder and nozzle body are lap finished to provide a fluid-tight seal preventing leakage of coolant and fuel.

Accordingly during operation of the nozzle, coolant is continuously supplied to the port 50 and flows through the passage 54, conduit 58, channel 71, passageway 43 to the chamber 48. The coolant circulates through the chamber 48 and passes out through outlet passageway 45, channel 73, conduit 60, outlet passage 56 to a return line (not shown) connected to outlet port 52. By this arrangement, rapid continuous circulation of the coolant through the injection nozzle is assured providing effective cooling of the nozzle. Various types of coolant may be used such as pressurized air, lubricating oil, water or the same fuel as that used in the engine.

The nozzle is preferably made of a steel which is or can be nitrided and the jacket 36 which is preferably of stainless steel is induction brazed adjacent opposite ends to the free outer end of the nozzle tip 14 and the lower portion of the nozzle body 13 with a brazing alloy of high silver content. By this arrangement, a tight joint is provided between the jack 36 and nozzle to prevent leakage of the coolant passing through the nozzle. Additionally the life of the assembly is extended by virtue of its resistance to galling and the fact that it is impervious to attack by various types of coolants employed. Further by assembling the parts in this manner, there is less chance of distorting the nozzle tip and weakening thereof so that the danger of premature failure of the nozzle is obviated.

Another embodiment of fuel injection nozzle in accordance with the present invention is illustrated in FIG. 7. The basic elements and arrangement of this nozzle are similar to that described above and include a nozzle body 113, a nozzle tip 114 projecting from the nozzle body which is of reduced cross section to provide a radial shoulder 115 at the juncture of the nozzle body and tip. The nozzle assembly additionally includes a jacket 136 comprising a generally cylindrical hollow sleeve 138 which circumscribes and is coextensive with the nozzle tip 114 and which is connected at its lower end to the outer end of the nozzle tip 114 and has at its opposite end a cup 139 in which the lower portion of the nozzle body nests. The cup 139 consists of a radial flange 140 abutting the shoulder 115 and a skirt 142 which projects upwardly from the flange 140 and is connected to the lower end of the nozzle body 113.

Axially extending inlet and outlet coolant conduits 158 and 160 are provided in the valve body which at their lower ends communicate with channels 171 and 173 formed by radial slots 164 in the shoulder 115 of the valve body and the radial flange 140 of the cup, thereby connecting the conduits 158 and 160 with inlet and outlet passageways 143 and 145 in the nozzle tip. The passageways 143 and 145 communicate with an annular cooling chamber 148 defined by the inner wall of the sleeve 138 and a circumferential axially extending undercut in the outer wall of the nozzle tip. Accordingly, coolant supplied to the holder 100 from a suitable source flows through the inlet passage 154 therein, conduit 158 aligned with the passage 154, channel 171, and passageway 143 to the coolant chamber 148. The coolant circulates in the chamber 148 and returns through passageway 145, channel 173, conduit 160 and passage 162 in the holder to a reservoir connected through a line to the holder.

In the present instance, the passageways 143 and 145 are formed by helical grooves 200 and 202 in the outer peripheral wall of the nozzle tip, each groove as shown extending approximately 180° around the periphery of the nozzle tip. The helical arrangement of the passageways effects a swirling action of the coolant providing for rapid movement of large quantities of coolant through the nozzle thereby providing for effective cooling of the nozzle. As illustrated, the grooves 200 and 202 are formed in diametrically opposed wall portions of the nozzle tip to provide a symmetrical construction which minimizes the tendency of the nozzle distort at elevated temperature conditions. As in the previously described embodiment, the nozzle body is preferably of a nitrided steel and the jacket is preferably brazed at opposite ends to the nozzle to provide the advantages discussed above.

FIG. 9 illustrates an assembly of a fuel injection nozzle constructed in accordance with the present invention and a modified type of nozzle holder wherein the coolant return passageway 262 in the holder communicates with the valve leakoff bore 264. The valve leakoff bore 264 extends axially of the holder and is in fluid communication with a reservoir or the like (not shown). This arrangement eliminates a separate coolant return line and is adapted for use in applications where the fuel is used as the coolant.

While various embodiments of the present invention have been illustrated and described herein, it is not intended to limit the invention and changes and modifications may be made therein within the scope of the following claims.

I claim:
1. In a fuel injection nozzle for internal combustion engines, a general cylindrical nozzle body, an elongated nozzle tip projecting from one end of said nozzle body, said nozzle tip being of a reduced cross section of define a shoulder at the juncture of said nozzle body and tip, a jacket including a generally cylindrical hollow sleeve surrounding said nozzle tip connected at one end adjacent the outer free end of said nozzle tip and having at its opposite end a cup in which the lower end of said nozzle body is nested, means defining a circumferentially extending cooling chamber adjacent the free end of said nozzle tip formed by the outer peripheral surface of said nozzle tip and the inner wall of said sleeve, means defining a pair of diametrically opposed inlet and outlet coolant passageways formed between the nozzle tip and sleeve extending downwardly from the shoulder at the juncture of said nozzle body and tip and respectively communicating with said cooling chamber, means defining a pair of inlet and outlet coolant conduits in said nozzle body, offset radially relative to said passageways and means defining a pair of radial grooves in said shoulder forming inlet and outlet channels connecting said inlet conduit with said inlet passageway and said outlet conduit with said outlet passageway to facilitate circulation of coolant through said nozzle and said cooling chamber.

2. A fuel injection nozzle as claimed in claim 1, wherein said nozzle body and tip are made of a nitrided steel and said jacket is made in a stainless steel and wherein said sleeve is secured to said nozzle tip and the cup is secured to the lower end of said nozzle body by a brazed connection.

3. In a fuel injection nozzle for internal combustion engines, a general cylindrical nozzle body, an elongated nozzle tip projecting from one end of said nozzle body, said nozzle tip being of a reduced cross section to define a shoulder at the juncture of said nozzle body and tip, a jacket including a generally cylindrical hollow sleeve surrounding said nozzle tip connected at one end adjacent the outer free end of said nozzle tip and having at its opposite end a cup in which the lower end of said nozzle body is nested, means defining a circumferentially extending cooling chamber adjacent the free end of said nozzle tip formed by the outer peripheral surface of said nozzle tip and the inner wall of said sleeve, means defining a pair of diametrically opposed helical grooves in the outer peripheral surface of said nozzle tip, each of said grooves extending approximately 180° around the periphery of said nozzle tip, said grooves forming with inner wall of said sleeve, inlet and outlet coolant passageways extending downwardly from the shoulder at the juncture of said nozzle body and tip and respectively communicating with the cooling chamber, means defining a pair of inlet and outlet coolant conduits in said nozzle body offset radially relative to said passageways, and means defining a pair of radial grooves in said shoulder forming inlet and outlet channels connecting said inlet conduit with said inlet passageway and said outlet conduit with said outlet passageway to facilitate circulation of coolant through said nozzle and said cooling chamber.

4. In combination, a generally cylindrical elongated nozzle holder having an axial leak-off bore extending from end to end, a fuel injection nozzle including a generally cylindrical nozzle body connected at one axial end to said holder and an elongated nozzle tip projecting from one end of said nozzle body, said nozzle tip being of a reduced cross section to define a shoulder at the juncture of said nozzle body and tip, a jacket including a generally cylindrical hollow sleeve surrounding said nozzle tip and connected at one end adjacent the outer free end of said nozzle tip and having at its opposite end a cup in which the lower end of said nozzle body is nested, means defining a circumferentially extending coolant chamber adjacent the free end of said nozzle tip formed by the outer peripheral surface of said nozzle tip and the inner wall of said sleeve, means defining a pair of diametrically opposed inlet and outlet coolant passageways formed between said nozzle tip and sleeve extending from the juncture of said nozzle body and tip and respectively communicating with the cooling chamber, means defining inlet and outlet coolant conduits in the nozzle body offset radially relative to said passageways, means defining a pair of radial grooves in said shoulder forming with said cup inlet and outlet channels connecting said inlet conduit with said inlet passageway and said outlet conduit with said outlet passageway to facilitate circulation of coolant through said nozzle and said cooling chamber and means defining an inlet coolant passage in said holder aligned respectively and in fluid communication with the inlet coolant conduit in said nozzle body and a short outlet passage connecting said outlet conduit with said leak-off bore whereby coolant may be circulated from said inlet passage in said holder through said cooling chamber and out through said leak-off bore in said holder.

5. In a fuel injection nozzle for internal combustion engines, a generally cylindrical nozzle body, an elongated nozzle tip projecting from one end of said nozzle body, said nozzle tip being of a reduced cross section to define a shoulder at the juncture of said nozzle body and tip, means defining a stepped axial bore in the nozzle body defining an upper bore section in the nozzle body and a lower bore section smaller in cross section than the upper bore section in the nozzle tip, an annular chamber at the juncture of the bore sections, an elongated valve mounted in said bore having a conical shoulder adjacent said annular chamber, the lower end of said valve being slightly smaller in cross section than the lower bore section, a jacket including a generally cylindrical hollow sleeve surrounding said nozzle tip connected at one end adjacent the outer free end of said nozzle tip and having at its opposite end a cup in which the lower end of said nozzle body is nested, means defining a circumferentially extending cooling chamber adjacent the free end of said nozzle tip formed by the outer peripheral surface of said nozzle tip and the inner wall of said sleeve, means defining a pair of diametrically opposed inlet and outlet coolant passageways formed between the nozzle tip and sleeve extending downwardly from the shoulder at the juncture of said nozzle body and tip and respectively communicating with said cooling chamber, means defining a pair of inlet and outlet coolant conduits in said nozzle body, and means defining a pair of radial grooves in said shoulder forming inlet and outlet channels connecting said inlet conduit with said inlet passageway and said outlet conduit with said outlet passageway to facilitate circulation of coolant through said nozzle and said cooling chamber.

References Cited in the file of this patent
UNITED STATES PATENTS

| 2,552,679 | Hogeman | May 15, 1951 |

FOREIGN PATENTS

| 874,469 | France | May 4, 1942 |
| 720,916 | Great Britain | Dec. 29, 1954 |

UNITED STATES PATENT OFFICE
CERTIFICATE OF CORRECTION

Patent No. 3,128,948　　　　　　　　　　　　　　April 14, 1964

Frank De Luca

It is hereby certified that error appears in the above numbered patent requiring correction and that the said Letters Patent should read as corrected below.

Column 3, line 31, for "jack" read -- jacket --; column 4, line 36, for "of", second occurrence, read -- to --; line 60, for "in" read -- of --.

Signed and sealed this 4th day of August 1964.

(SEAL)
Attest:

ERNEST W. SWIDER
Attesting Officer

EDWARD J. BRENNER
Commissioner of Patents